United States Patent [19]

Fink

[11] Patent Number: 4,592,235

[45] Date of Patent: Jun. 3, 1986

[54] OPTICAL ACCELEROMETER

[76] Inventor: Lawrence E. Fink, 13029 SE. 189th Ct., Renton, Wash. 98055

[21] Appl. No.: 553,081

[22] Filed: Nov. 18, 1983

[51] Int. Cl.$^4$ .......................... G01P 1/02; G01P 15/08
[52] U.S. Cl. .................................... 73/517 R; 73/431; 73/493; 250/231 R
[58] Field of Search ................... 73/493, 517 R, 653, 73/651, 431; 250/231 R, 232, 239

[56] References Cited

U.S. PATENT DOCUMENTS

| | | | |
|---|---|---|---|
| 2,343,063 | 2/1944 | Kent | 73/517 R |
| 3,789,674 | 2/1974 | Anderson et al. | 73/517 |
| 3,798,454 | 3/1974 | Weiss | 250/232 |
| 3,949,219 | 4/1976 | Crouse | 250/239 |
| 4,047,045 | 9/1977 | Paxton et al. | 250/551 |
| 4,239,963 | 12/1980 | August et al. | 250/231 |

Primary Examiner—Stewart J. Levy
Assistant Examiner—John E. Chapman, Jr.
Attorney, Agent, or Firm—Bruce A. Kaser; Delbert J. Barnard

[57] ABSTRACT

An LED (18) is spaced from and directed toward a photosensitive member such as a photoresistor (16). A shutter plate (38) positioned between the photoresistor (16) and the LED (18) varies the amount of light received by the photoresistor from the LED. The shutter plate (38) is connected to one end of a cantilever beam (20) which deflects in response to acceleration forces. The shutter plate (38) variably interferes with the amount of light the photoresistor (16) receives as the cantilever beam (20) deflects. The photoresistor (16) has a plurality of photosensitive grid lines (58) which change the resistance of the photoresistor in proportion to the number of grid lines which receive light from the LED (18). The photoresistor (16), LED (18), and cantilever beam (20) are connected to electrically conductive mounting pins (14) which are inserted in a base member (12) and extend downwardly therethrough.

2 Claims, 8 Drawing Figures

OPTICAL ACCELEROMETER

DESCRIPTION

1. Technical Field

This invention relates to optical accelerometers. More particularly, it relates to a small size optical accelerometer which is pin mountable onto a printed circuit board.

2. Background Art

One known form of optical accelerometer comprises a light source directed toward a photoelectric cell which is adapted to convert a light signal into an electrical signal. A shutter is located between the light source and the photoelectric cell. The shutter position is determined by acceleration forces and the position of the shutter determines the amount of light which is transmitted to the photoelectric cell. In this manner, an acceleration condition is measured and converted into an electrical signal.

It is known to mount the shutter element on the free end of a beam which is mounted to swing (as opposed to bend) in position in response to acceleration forces. This type of accelerometer is shown by U.S. Pat. No. 2,498,997, granted Feb. 28, 1950 to William B. McLean et al. It is also known to mount a shutter on the end of a beam that is supported to bend. See U.S. Pat. No. 4,239,963, granted Dec. 16, 1980, to Rudolf R. August et al, relating to a digital fiber optic accelerometer.

Other optical accelerometers known in the patent literature are shown by the following U.S. patents: No. 2,301,396, granted Nov. 10, 1942 to Anton Graf; No. 2,351,955, granted June 20, 1944 to Anton Graf; No. 2,957,653, granted Oct. 25, 1960 to Donald E. Gillum; No. 3,091,972, granted June 4, 1963 to Alan R. Johnston; No. 3,113,464, granted Dec. 10, 1963 to Meyer B. Shulman; No. 3,159,750, granted Dec. 10, 1964 to Eugene I. Kazan; No. 3,224,279, granted Dec. 21, 1965 to Guido Galli et al; No. 3,275,835, granted Sept. 27, 1966 to Stanley R. Morrison; No. 3,431,417, granted Mar. 4, 1969 to Henry R. Chope; No. 3,474,680, granted Oct. 28, 1969 to Robert G. Babson et al; No. 3,789,674, granted Feb. 5, 1974, to Mathew E. Anderson et al; No. 3,967,135, granted June 29, 1976, to Morton S. Balban et al; and No. 4,035,637, granted July 12, 1977, to Ronald A. Lenhart. U.S. Pat. No. 3,789,674 discloses mounting a mass-carrying mirror onto the free end of a cantilever beam. The light source is directed toward the mirror. Acceleration forces acting on the mass determine the angular position of the mirror relative to both the light source and a pair of photoelectric cells which are positioned on opposite sides of the light source.

It is also known to mount a shutter at the free end of a bi-metallic beam which changes shape and repositions the shutter in response to temperature changes. An instrument of this type is shown in U.S. Pat. No. 3,158,028, granted Nov. 24, 1964 to Henry R. Chope.

The above patents are to be carefully studied for the purpose of putting the present invention into proper perspective relative to the prior art.

DISCLOSURE OF THE INVENTION

In basic form, the present invention comprises a light responsive means, a light emitting diode (LED) spaced from and directed to emit light toward the light responsive means, and a shutter plate which is positioned between the light responsive means and the LED.

The shutter plate is connected to one end of a cantilever beam. A second end of the beam is fixed to a support. The cantilever beam deflects in response to acceleration forces which cause the shutter plate to move back and forth between the light responsive means and the LED. This varies the amount of light which is received by the light responsive means as a function of the acceleration forces acting on the beam.

The light responsive means, LED and cantilever beam are connected to a mounting means. The mounting means includes a base member having first and second sides. The mounting means also includes a plurality of conductive members. Each conductive member has a terminal portion on the first side of the base member and a projecting pin portion on the second side of the base member. The projecting pin portion of each conductive member enables it to be inserted through a socket opening in the base member. Each conductive member is inserted through a separate socket opening.

The light responsive means and the LED are both electrically and structurally connected to terminal portions of the conductive members. In a preferred embodiment of the invention, the light responsive means has a pair of conductors for making such connections. One conductor is connected to the terminal portion of a first conductive member. The other conductor is connected to the terminal portion of a second conductive member. Furthermore, in one embodiment of the invention, said first conductive member extends through a socket opening located on one side portion of the base member, and said second conductive member extends through a separate socket opening located on another side portion of the base member. In another embodiment of the invention, said first and second conductive members extend through separate socket openings which are located on the same side portion of the base member.

In a manner like that just described for the light responsive means, in a preferred embodiment of the invention, the LED likewise has a pair of conductors for making the same kinds of connections to terminal portions of a different set of first and second conductive members.

In preferred form, the cantilever beam is mounted to the base member by a support fixed to the second end of the beam. The support may include a first end connected to the terminal portion of a conductive member, and a second end connected to the terminal portion of another conductive member. One aspect of the invention is that the cantilever beam can be supportably connected directly to the terminal portion of a single conductive member, if so desired. Another aspect of the invention is that an end of the beam can be supportably connected directly to the base member.

The light responsive means comprises a light-receiving surface having an area of incidence that varies as the shutter plate moves in response to acceleration forces. This light-receiving surface is responsive to light from the LED such that the surface changes the electrical response of the light responsive means in substantial proportion to the changes in its area of incidence. Therefore, as the shutter plate moves back and forth between the light responsive means and the LED, the electrical response of the light responsive means changes proportionately.

In a preferred embodiment of the invention, the light-receiving surface has a grid-like portion which comprises a plurality of parallel but interconnected light-receiving grid lines. The number of grid lines which receive light vary in accordance with the area of incidence of the light-receiving surface. The grid lines are photosensitive for changing the electrical response of the light responsive means, and they change such response in substantial proportion to the number of grid lines which receive light.

The cantilever beam can be mounted to the base member such that it can deflect in response to acceleration forces that are either perpendicular or parallel to the base member. When the beam is deflective in response to perpendicular forces, the grid lines on the light-receiving surface are positioned substantially parallel to the base member. On the other hand, when the beam is deflective in response to parallel forces, the grid lines are then positioned substantially perpendicular to the base member.

The cantilever beam includes means for both adjusting the deflective response of the beam to acceleration forces, and for changing the position of the shutter plate relative to the light responsive means and the LED. The beam comprises a deformable spring wire that can be bent and unbent for accomplishing this purpose. In another embodiment of the invention, the beam includes an adjustably positionable mass adjacent the beam. Changing the position of the mass relative to the beam changes the response of the beam to acceleration forces. Changing the position of the mass can also alter the position of the shutter plate relative to the light responsive means and the LED.

A housing can be connected to the first side of the base member. The housing provides a chamber that encloses the light responsive means, the LED, the shutter plate, the cantilever beam and the terminal portions of the conductive members. Venting means can be included for equalizing the air pressure between the chamber and the outside of the housing.

An object of the present invention is to provide an accelerometer which accurately measures acceleration forces.

Another object of the present invention is to provide an accelerometer which is efficient in design, easy to use, and is easy to adjust in regard to its response to acceleration forces.

An advantage to the present invention is that because of its efficient design, it has the ability to be easily connected to external electrical circuitry. For example, the invention is ideally suited for use with common printed circuit boards.

Another advantage to the present invention is that it is easily adjustable, both in the manner which the light responsive means, LED, and cantilever beam can be connected to the mounting means, and the manner by which cantilever beam deflective response can be changed. The position of the shutter plate relative to the light responsive means and LED is also easily adjustable.

Another advantage to the present invention is that it provides an electrical output response which is substantially linear in proportion to the acceleration forces that are being measured.

A further advantage to the present invention is that it can be manufactured in a small, compact, and lightweight form. The invention is well suited for measuring acceleration forces on almost any type of moving body, even small model airplanes, for example.

These and other advantages of the invention will become more readily apparent when the description of the invention is read in conjunction with the drawings.

BRIEF DESCRIPTION OF THE DRAWINGS

In the drawings, like reference characters refer to like parts throughout, and.

BEST MODE FOR CARRYING OUT THE INVENTION

Figure 1:
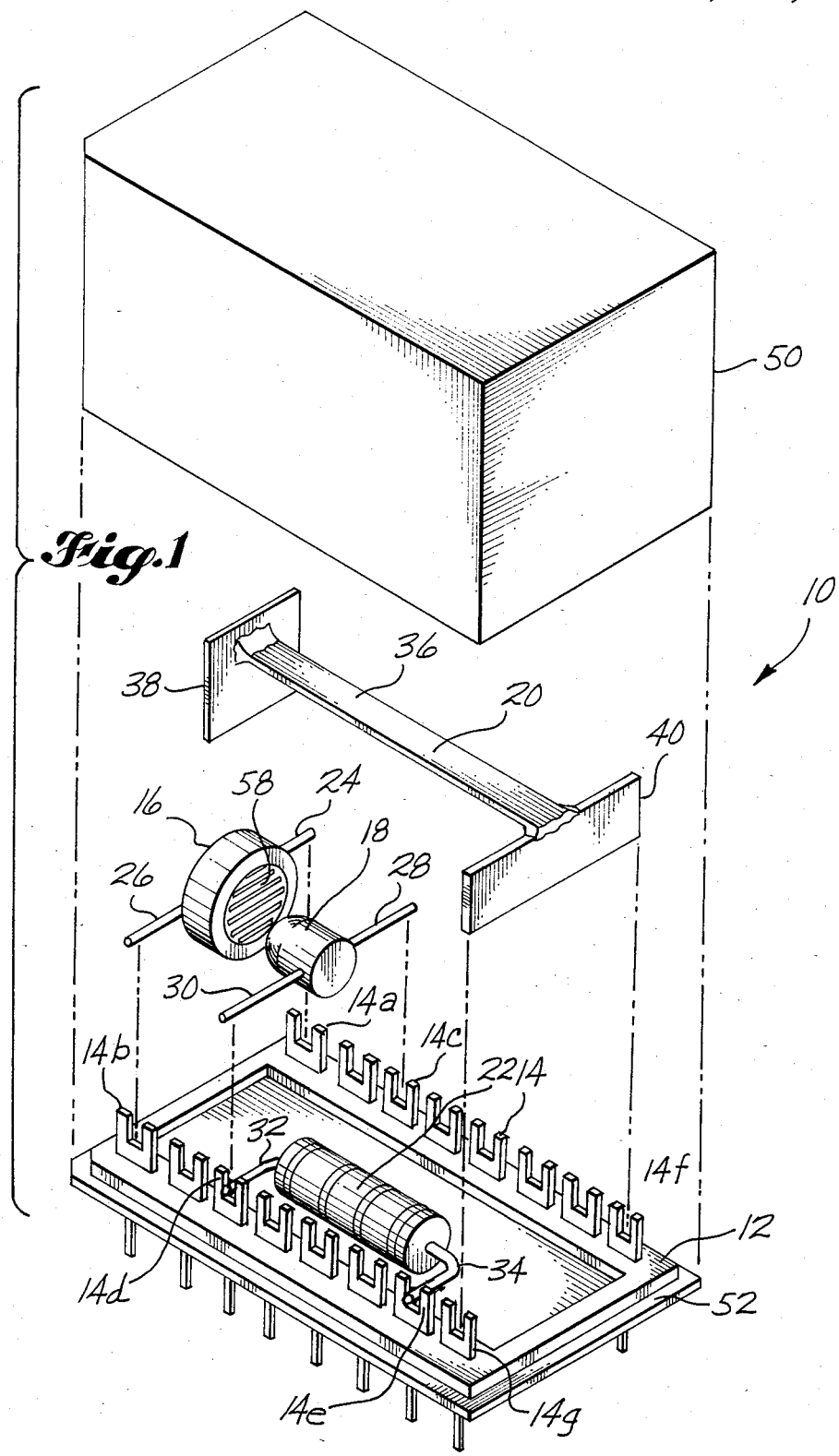
FIG. 1 is an exploded pictorial view of a first embodiment of the invention.
Figure 2:
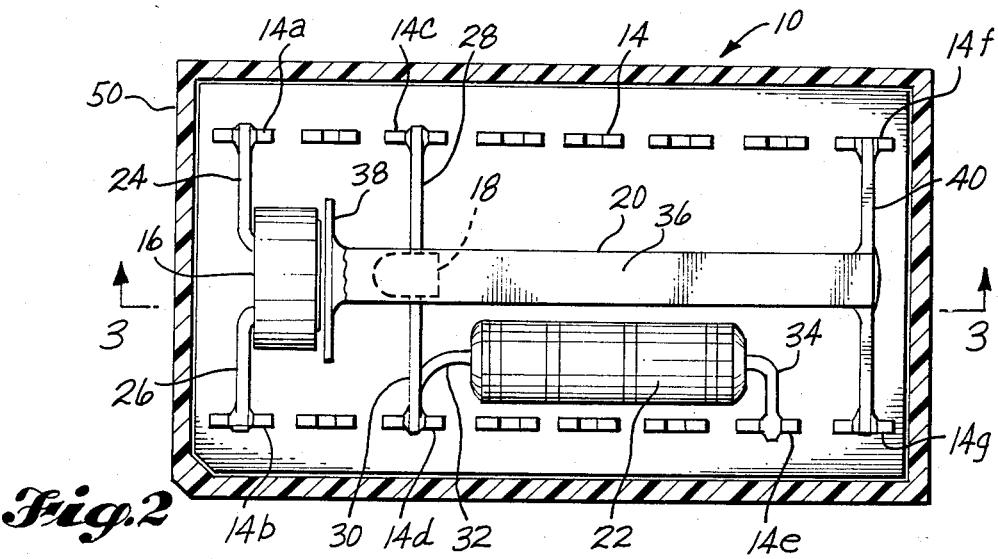
FIG. 2 is a sectional view taken substantially along line 2—2 of FIG. 3, presenting a top plan view of the accelerometer components of the embodiment shown in FIG. 1.
Figure 3:
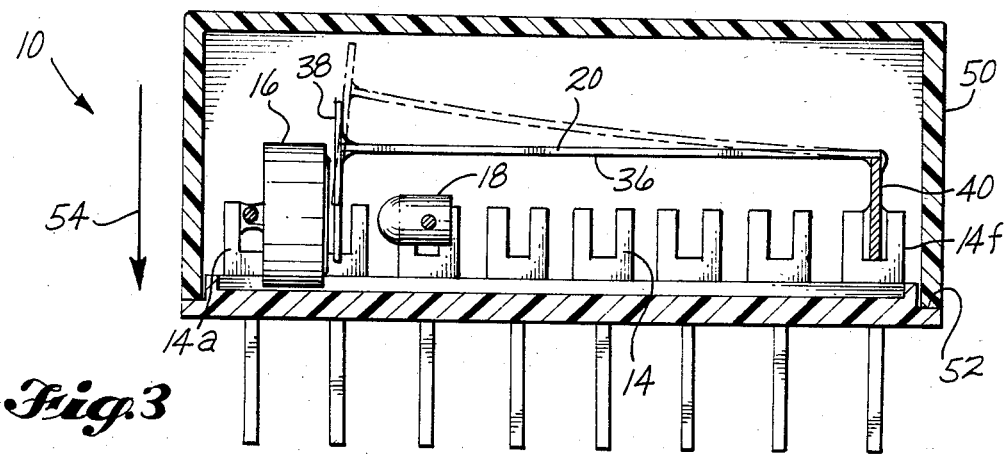
FIG. 3 is a longitudinal sectional view of the embodiment shown in FIGS. 1 and 2 looking along line 3—3 of FIG. 2.

Referring first to FIGS. 1-3 of the drawings, indicated generally by 10 is a first embodiment of the invention. There is shown in FIG. 1 a base member 12 having a plurality of conductive members, indicated generally by numeral 14, inserted into the base member. The conductive members 14 are inserted through socket openings (shown as slots 15 in FIGS. 5 and 6). Conductive members 14 have terminal portions 14' and pin portions 14". The terminal portions 14' are positioned on a first side of base member 12 and provide a means for connecting a light responsive means such as a photoresistor 16, a light emitting diode (LED) 18, a cantilever beam 20, and a resistor 22 to the base member. These connections will be further discussed hereinafter.

The pin portions 14" extend downwardly from a second side of base member 12. In preferred form, the pin portions 14" are electrically conductive, and they are inserted in base member 12 as a pair of parallel rows. This configuration enables the invention to be electrically compatible for plugging into printed circuit boards which have electrical sockets for receiving pin portions 14".

In a preferred embodiment of the invention, a photoresistor 16 is connected to terminal portions 14A and 14B by a pair of conductors 24 and 26, respectively. Such connections could be made by soldering, for example. It should be understood that for terminology purposes, sometimes photoresistors are referred to as photoconductors. Essentially they have the same function. The conductors 24, 26 extend laterally outwardly from and transmit an electric current through the photoresistor 16. The LED 18 is connected in much the same manner as the photoresistor 16. The LED 18 is connected to terminal portions 14C and 14D by means of laterally extending conductors 28 and 30. In preferred form, the conductors 24, 26, 28 and 30 have sufficient rigidity such that they can support photoresistor 16 and LED 18 spaced in relation to the first side of base member 12, if such spaced relation is desired. If not, the photoresistor 16 and LED 18 could be directly supported by the first side of base member 12. If this is done, the body of either the photoresistor 16 or the LED 18 could be adhesively bonded to the base member for added support.

The resistor 22 is serially connected to LED 18 by a first conductor 32. Conductor 32 is connected to the same terminal portion 14D as conductor 30 which extends from LED 18. A second conductor 34 connects resistor 22 to another terminal portion 14E. The resistor 22 protects the LED 18 by limiting the electrical current that can be transmitted through the LED such that the maximum current carrying capacity of the LED is not exceeded. Although the drawings show resistor 22 as being mounted to base member 12, it could be located externally as well, i.e. the resistor could be serially connected to LED 18 by connecting it to outer pin portion 14D''.

In preferred form, cantilever beam 20 is composed of a spring wire 36 having a shutter plate 38 connected to one end. By way of example only, the shutter plate 38 could be soldered to the end of spring wire 36. As an alternative to this, the shutter plate 38 could be integrated as a part of the spring wire 36, i.e., the shutter plate could be created by making a 90° bend in the end of a sufficiently wide piece of spring wire. A support 40 connected to the second end 42 of the beam 20 mounts the beam to base member 12. In the first embodiment of the invention, shown in FIGS. 1-3, the support 40 has two ends, each of which is connected to terminal portions 14F and 14G, respectively.

Figure 4:
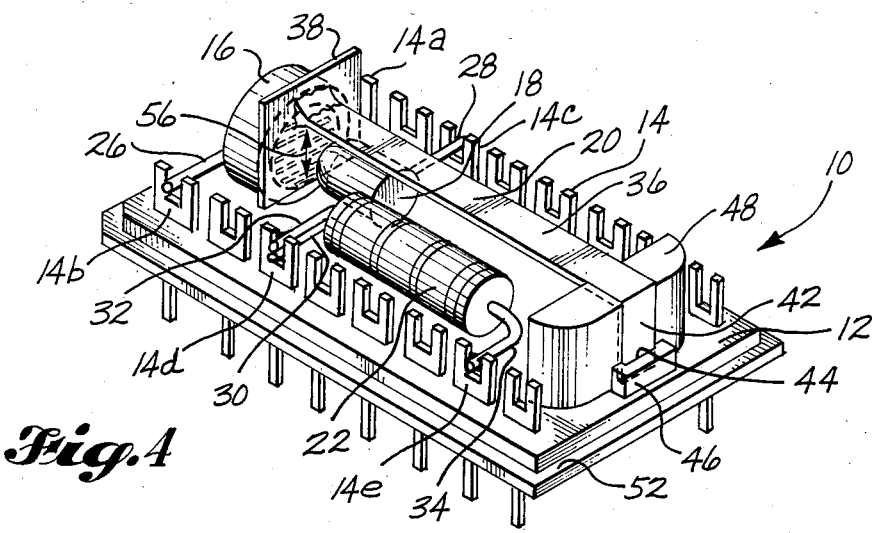
FIG. 4 is a pictorial view of a second embodiment of the invention with the housing removed.

A second embodiment of the invention is shown in FIG. 4. In this embodiment, the cantilever beam 20 is shown as having a different form of end support. Instead of being connected to terminal portions 14F, 14G, as shown in FIGS. 1-3, the end 42 of beam 20 is bent into a substantially 90° angle and is supported by a block 44. The bent end 42 of beam 20 fits into a groove 46 that prevents lateral movement of the beam in transverse directions relative to base member 12. Beam end 42 is fixedly connected to base member 12 by insertion into another block 48. Both blocks 44 and 48 can be either bonded to base member 12, or integrated as a homogeneous structural portion thereof. As an alternative to fixedly inserting beam end 42 into block 48, block 48 could be removed from base member 12, and the beam end 42 could be directly bonded to the first side of the base member. As a further alternative, beam end 42 may have sufficient stiffness to support the beam 20 such that block 44 could be removed and end 42 could be bonded directly to the first side of base member 12.

The LED 18 is directed toward photoresistor 16 for emitting light to it with the LED being spaced from the photoresistor such that the shutter plate 38 can be positioned between them. The shutter plate 38 variably interferes with the light received by the photoresistor 16 from the LED 18. The amount of shutter interference is determined by the deflective response of cantilever beam 20 to acceleration forces. To illustrate this interference, attention is now directed to FIGS. 1-3 and FIG. 4 which show two embodiments of the invention having a cantilever beam 20 that is operable in response to acceleration forces that are substantially perpendicular to base member 12. Referring specifically to FIG. 3, cantilever beam 20 is shown in a non-operative, initial position by solid lines, i.e. there are no acceleration forces acting on the beam. The dash-dot-dash lines show the beam 20 as it deflects in response to an acceleration of the embodiment shown in FIG. 3 as it moves in the direction of arrow 54. The shutter 38 moves in correspondence with such deflection, and permits photoresistor 16 to receive more light from LED 18. Depending on the direction of movement, i.e., up or down relative to base member 12, the shutter plate 38 translates vertically in the directions indicated by arrows 56 in FIG. 4.

The photoresistor 16 has an electrical resistance that varies in accordance with the amount of light that it receives from LED 18. Photoresistor 16 has a light receiving surface 57 (see FIG. 1) with an area of incidence that varies as shutter plate 38 moves in accordance with the response of beam 20 to acceleration forces. This variation in area of incidence varies the amount of light that the photoresistor 16 receives and has a corresponding effect on the electrical resistance of the photoresistor.

In a preferred embodiment of the invention, the surface 57 has a grid-like portion with a number of parallel but interconnected photosensitive grid lines 58. It should be noted that the interconnections of the grid lines 58 are not shown in the drawings. The grid lines 58 are interconnected in such manner than an end of a first grid line is connected to the end of a line which is adjacent one side of the first line. The opposite end of the first line is connected to the end of another grid line which is adjacent the other side of the first line. The grid lines 58 are thusly connected together in a continuous manner across the face of surface 57. To further explain these interconnections, referring to FIG. 1, an end 58A of a first grid line is electrically connected to an end 58B of a second grid line. The other end 58B' of the second grid line is connected to an end 58C' of a third grid line. These connections can either be made beneath the face of surface 57, or they can be made directly from grid line to grid line on the face of surface 57, which is the usual configuration on many currently manufactured photoresistors.

The resistance of photoresistor 16 changes in accordance with the number of grid lines that are shaded by shutter plate 38. For example, when beam 20 deflects upwardly as shown in FIG. 3, a lesser number of grid lines are shaded. This causes a decrease in the resistance of photoresistor 16. If beam 20 deflects oppositely, shutter plate 38 moves downwardly and a greater number of grid lines are shaded resulting in a corresponding increase in the resistance of the photoresistor 16.

A photoresistor having substantially the same grid line arrangement as described above is manufactured by VACTEC, Incorporated, 10900 Page Boulevard, St. Louis, Mo. 63132, and sold as part No. VT-93L. The wave length of light radiation emitted by the LED must be compatible with the spectral response of the photoresistor. Therefore, an example of an LED which is compatible with the above photoresistor is manufactured by LITRONIX, a division of the Siemens Corporation, and sold as a miniature axial lead LED lamp, part No. YL-56. It is to be understood that for purposes of the present invention it is possible to use various combinations of LEDs which are compatible with photoresistors. For example, such combinations could be designed to operate in the visible light range (a wave length of approximately 3900 angstroms to a wave length of 7700 angstroms), or in the infrared and ultraviolet ranges as well.

The photoresistor grid line arrangement described above should be understood to be a preferred form for the present invention. However, other types of light responsive photoresistors having the capability to change resistance in proportion to the amount of light which they receive are applicable for use in this invention as well, even though they do not have the same type grid arrangement as that which was described above.

Another possible form of light responsive means could be a photovoltaic cell (solar cell). The only difference in use between a photovoltaic cell and photoresistor is that the photovoltaic cell would yield a variable voltage rather than a variable resistance output in response to movement of the shutter plate 38.

The embodiments shown in FIGS. 1-4 have a cantilever beam 20 supported at one end in such a manner that the beam deflects only in response to vertical acceleration forces which are substantially perpendicular to base member 12. In these embodiments, the grid lines 58 are positioned on surface 57 such that their longitudinal lengths are substantially parallel to a plane defined by base member 12. The face of surface 57 is substantially perpendicular to the base member, however. This configuration is best shown in FIG. 1.

Figure 5:
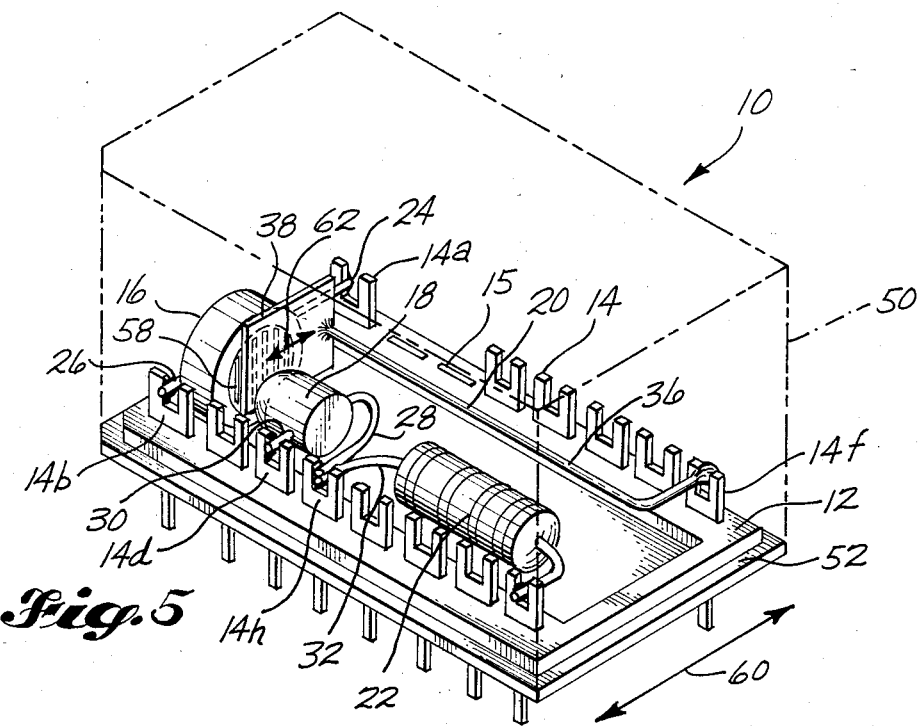
FIG. 5 is a pictorial view of a third embodiment of the invention with the housing shown by phantom lines.
Figure 6:
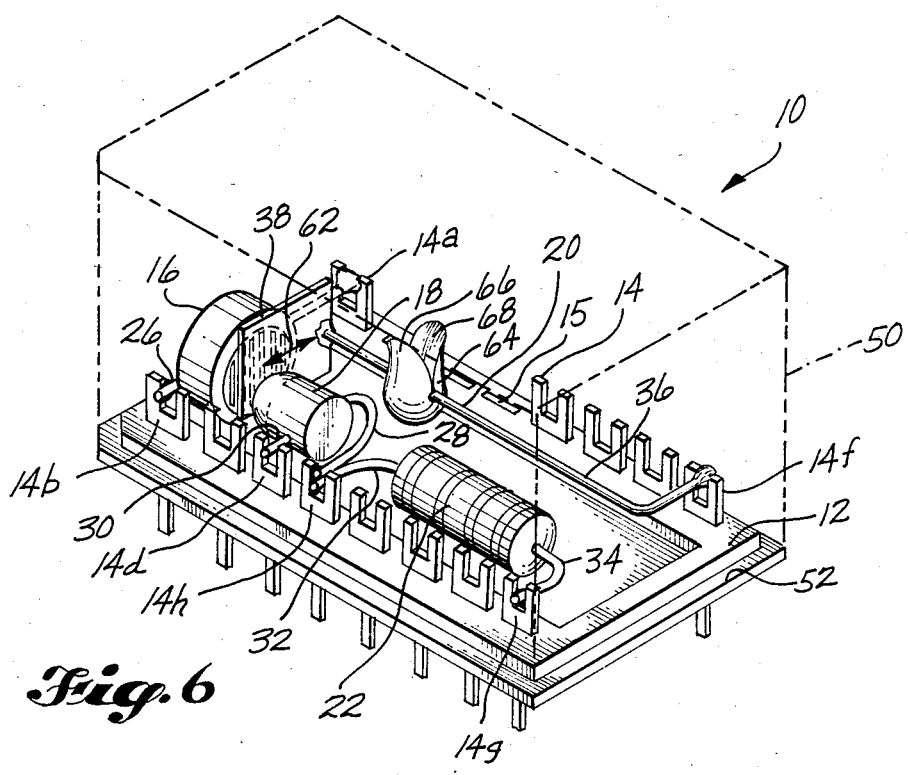
FIG. 6 is a pictorial view of a fourth embodiment of the invention with the housing shown by phantom lines.

In the embodiments shown in FIGS. 5-6, the beam 20 is responsive to horizontal acceleration forces, i.e. forces which are substantially parallel or sideways relative to base member 12 in the directions shown by arrows 60 in FIG. 5. In these embodiments, the grid lines 58 are rotated 90° relative to the embodiments shown in FIGS. 1-4. In other words, the grid lines 58 are now in a substantially perpendicular position relative to the plane defined by base member 12.

As was mentioned earlier, the face of surface 57 has an area of incidence which varies in accordance with the movement of shutter plate 38. As the cantilever beam 20 deflects in response to an acceleration force, a shadow line defined by edge 59 on shutter 38 sweeps across surface 57 thereby changing its area of incidence. In the embodiments of the invention discussed above, the grid lines 58 are positioned on surface 57 such that they are substantially parallel to this shadow line. Therefore, depending on the direction of the acceleration force, the shadow line moves across surface 57 and exposes either a greater or a smaller area of incidence, and consequently, a greater or lesser number of grid lines 58. It is believed that having this configuration enhances the linear response of the photoresistor to acceleration forces.

Figure 7:
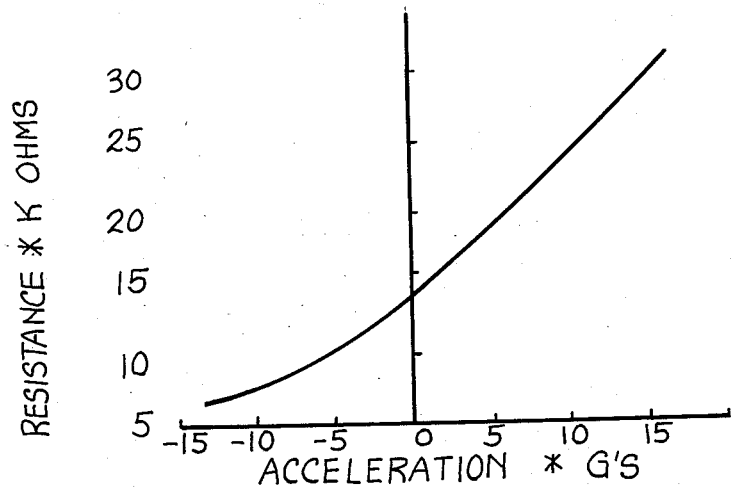
FIG. 7 is a graph of electrical resistance versus acceleration, illustrating the response to acceleration, of an embodiment of the invention like that which is shown in FIG. 5.
Figure 8:
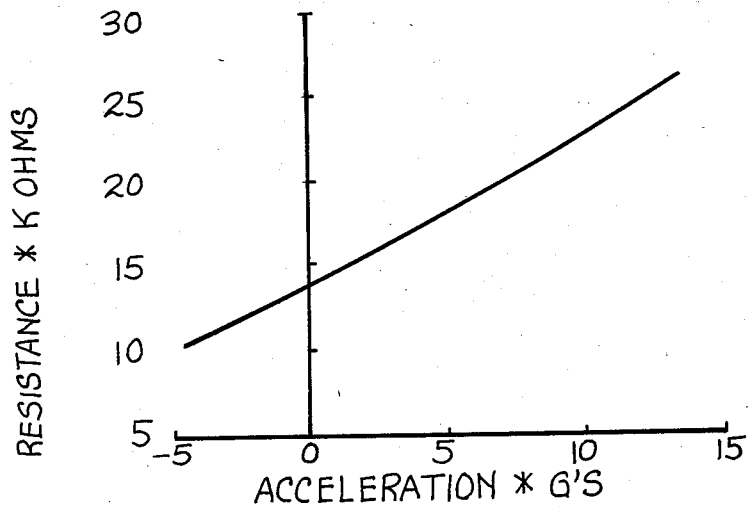
FIG. 8 is a graph like FIG. 7, but illustrating the electrical resistance response versus acceleration of an embodiment of the invention like that which is shown in FIG. 5 for a more limited range of acceleration forces.

The electrical resistance of photoresistor 16 is measurable and can be directly correlated to acceleration forces. For example, FIG. 7 shows the actual test results for an embodiment of the invention like that which is shown in FIG. 5. The test embodiment was subjected to a range of horizontal acceleration forces. As is apparent from FIG. 7, the resistance of the photoresistor changed substantially linearly in relation to the acceleration of the test embodiment. Likewise, FIG. 8 shows further test results for the same embodiment. In this test, the range of acceleration forces was reduced resulting in an improvement in linearity of response of the photoresistor for this more limited range.

In the embodiments shown in FIGS. 5 and 6, the cantilever beam 20 is operable for measuring horizontal acceleration forces in the direction indicated by arrows 60. In these Figs., the spring wire 36 of the beam 20 is bent at a 90° angle at its end 42 and is supportably connected to terminal portion 14F. The spring wire 36 has equal thicknesses through its cross-sectional area. This construction gives the beam 20 the capability to deflect in response to either horizontal or vertical acceleration forces. For example, rotating photoresistor 16 by 90° would convert these embodiments for measuring vertical acceleration forces.

The embodiments shown in FIGS. 5 and 6 differ from those shown in FIGS. 1-4 in that a rectangular strip of spring wire 36, wide in one direction and narrow in the other, forms the beam 20 in FIGS. 1-4. The beam 20 as shown in these Figs. can deflect in response to vertical acceleration forces only. It is inflexible for horizontal movement. It should be noted, however, that a rectangular strip of spring wire 36 could easily be used in the embodiments shown in FIGS. 5 and 6. For such use, it would only be necessary to rotate a rectangular strip of spring wire by 90° and connect its end 42 to terminal portion 14F in the same manner as is already shown in these Figs.

For the beam 20 to deflect horizontally, the conductor 28 (which formerly extended from LED 18 to terminal portion 14C) was disconnected from terminal portion 14C (not shown in these Figs.). Conductor 28 was then reconnected to terminal portion 14H. The resistor 22 remained serially connected to the LED, but was repositioned and connected to terminal portions 14H and 14G, respectively. This new configuration enables spring wire 36 to freely deflect back and forth in the area formerly occupied by conductor 28.

Having a plurality of parallel electrically conductive members 14 inserted in side portions of base member 12 makes it easy to disconnect and reconnect in a variety of ways the components mounted to the base member. In other embodiments of the invention, conductive members 14 could also be inserted through side portions on the longitudinal ends of base member 12. For example, it would be possible for the entire perimeter of the base member to have conductive members. This configuration, however, is not shown in the drawings.

The photoresistor 16, LED 18, cantilever beam 20 (including shutter plate 38), resistor 22, and the terminal portions 14' of conductive members 14 are all enclosed in a chamber formed by a housing 50. This housing 50, as shown by the figures, has a generally rectangular shape and fits atop base member 12. The housing is opaque, and is connected to the base member such that no light can pass into the chamber. Therefore, the only light (visible, infrared, or ultraviolet) in the chamber is that which is emitted by the LED.

The housing 50 rests on a support shoulder 52 which extends around the perimeter of base member 12. Fitment of the housing 50 to the base member 12 is best shown in FIG. 3.

FIGS. 5 and 6 also show socket openings 15 in base member 12 which result from the removal of some of the conductive members 14. This has a two-fold purpose: First, it gives the cantilever beam 20 a wider range of deflective movement back and forth, if such wider range is needed or desired. Second, removing these conductive members enables socket openings 15 to serve as a vent through base member 12. For certain applications of the invention, venting is a desirable feature in that it prevents the occurrence of a large pressure gradient between the inside and the outside of the housing 50. Such a gradient could deform the housing and base member, thereby causing the invention to inaccurately measure acceleration forces.

In all of the embodiments presented herein, the spring wire 36 is deformable and can be bent or unbent for providing a means to alter the initial non-operative position of shutter plate 38 relative to photoresistor 16 and LED 18. This bending and unbending causes the responsive characteristics of the photoresistor 16 to change, but the response remains substantially linear in relation to the acceleration. It is possible to alter the position of the shutter 38, and the deflective response of the beam 20 by other means. For example, an adjustable set screw, mounted such that the end of the screw abuts adjacent end 42 of beam 20, could fulfill the same function. This type of arrangement is not shown in the drawings, however.

FIG. 6 shows another embodiment of the invention wherein a mass 64 is slidably mounted on cantilever beam 20 for altering beam deflective response. Typically, mass 64 is a malleable material, such as lead. End portions 66 and 68 of the mass 64 can be spread part and then reclosed, thereby enabling the mass to be slidably repositioned along beam 20 in much the same manner as common lead fishing sinkers are repositioned on fishing line. By opening and closing end portions 66 and 68, the mass can be fixed at any desired position on beam 20. Changing the position of the mass on the beam alters beam deflective response to acceleration forces. In addition, for those embodiments of the invention which are responsive to vertical acceleration forces, changing the position of the mass will also change the initial non-operative position of shutter plate 38 relative to photoresistor 16 and LED 18.

The above description is to be interpreted only in the sense that it describes the best mode for carrying out the invention. It is apparent that changes in the invention, not included in the above description, could be made without departing from the spirit and scope of the invention. The invention is not to be limited by the above description. It is intended that the scope of the invention shall be limited only by the appended claims which follow.

I claim:

1. A solid state accelerometer, comprising:
   light responsive means for producing an electrical signal proportional to light intensity;
   an LED spaced from and directed to emit light toward said light responsive means;
   a shutter plate positioned between said light responsive means and said LED;
   a cantilever beam having a first end connected to said shutter plate and a second end fixed to a support, said support enabling said cantilever beam to deflect in response to acceleration forces acting on the beam and the shutter plate, and to move the shutter plate to vary the amount of light received by said light responsive means from the LED as a function of acceleration; and
   mounting means including a base member having first and second sides and a plurality of conductive members, each conductive member extending through a separate socket opening in the base member and each having a terminal portion on the first side of the base member and a projecting pin portion on the second side of the base member, said projecting pin portion being insertable into another socket opening in a printed circuit board, wherein said light responsive means, said LED and said cantilever beam are connected to said mounting means, and wherein the support fixed to the second end of said cantilever beam includes a first end connected to the terminal portion of a conductive member, and a second end connected to the terminal portion of another conductive member.

2. A solid state accelerometer, comprising:
   light responsive means for producing an electrical signal proportional to light intensity;
   an LED spaced from and directed to emit light toward said light responsive means;
   a shutter plate positioned between said light responsive means and said LED;
   a cantilever beam having a first end connected to said shutter plate and a second end fixed to a support, said support enabling said cantilever beam to deflect in response to acceleration forces acting on the beam and the shutter plate, and to move the shutter plate to vary the amount of light received by said light responsive means from the LED as a function of acceleration; and
   mounting means including a base member having first and second sides and a plurality of conductive members, each conductive member extending through a separate socket opening in the base member and each having a terminal portion on the first side of the base member and a projecting pin portion on the second side of the base member, said projecting portion being insertable into another socket opening in a printed circuit board, wherein said light responsive means, said LED and said cantilever beam are connected to said mounting means, and wherein the second end of said cantilever beam is supportably connected to the terminal portion of a conductive member.

* * * * *